United States Patent
Mueller et al.

(10) Patent No.: US 10,153,675 B2
(45) Date of Patent: Dec. 11, 2018

(54) ELECTRICAL MACHINE

(71) Applicant: LEANTEC MOTOR GMBH, Saalfeld (DE)

(72) Inventors: Udo Mueller, Starnberg (DE); Soeren Hein, Munich (DE)

(73) Assignee: LEANTEC Motor GmbH, Saalfeld (DE)

( * ) Notice: Subject to any disclaimer, the term of this patent is extended or adjusted under 35 U.S.C. 154(b) by 282 days.

(21) Appl. No.: 15/035,910

(22) PCT Filed: Nov. 10, 2014

(86) PCT No.: PCT/EP2014/003001
§ 371 (c)(1),
(2) Date: May 11, 2016

(87) PCT Pub. No.: WO2015/067371
PCT Pub. Date: May 14, 2015

(65) Prior Publication Data
US 2016/0276891 A1  Sep. 22, 2016

(30) Foreign Application Priority Data

Nov. 11, 2013 (EP) ..................... 13005299

(51) Int. Cl.
*H02K 3/28* (2006.01)
*H02K 3/14* (2006.01)
*H02K 1/16* (2006.01)
*H02K 3/02* (2006.01)
*H02K 3/12* (2006.01)
*H02K 3/30* (2006.01)

(52) U.S. Cl.
CPC ............... *H02K 3/28* (2013.01); *H02K 1/165* (2013.01); *H02K 3/02* (2013.01); *H02K 3/12* (2013.01); *H02K 3/14* (2013.01); *H02K 3/30* (2013.01)

(58) Field of Classification Search
CPC ............ H02K 3/04; H02K 15/04; H02K 3/26; H02K 15/0414; H02K 3/47; Y10T 29/49009
See application file for complete search history.

(56) References Cited

U.S. PATENT DOCUMENTS

| | | | | |
|---|---|---|---|---|
| 5,906,909 A | * | 5/1999 | Ellis | ................ B41N 1/006 101/456 |
| 6,163,097 A | * | 12/2000 | Smith | ................ H02K 3/04 310/156.36 |
| 2003/0164656 A1 | * | 9/2003 | Sakurai | ................ H02K 3/12 310/201 |

(Continued)

FOREIGN PATENT DOCUMENTS

| | | |
|---|---|---|
| EP | 2255431 A1 | 12/2010 |
| JP | S5594554 A | 7/1980 |

*Primary Examiner* — Naishadh Desai
(74) *Attorney, Agent, or Firm* — Laurence A. Greenberg; Werner H. Stemer; Ralph E. Locher

(57) ABSTRACT

A stator for an electric machine has a stator block and at least one first and one second phase winding. The first and second phase windings are supplied with current having different phases. At least one stator slot is formed in the stator block. Several layers of the first phase winding and several layers of the second phase winding are arranged in the stator slot. One layer of the first phase winding defines a layer of the second phase winding in the stator slot.

14 Claims, 4 Drawing Sheets

(56) References Cited

U.S. PATENT DOCUMENTS

| | | | |
|---|---|---|---|
| 2005/0093393 A1* | 5/2005 | Hirzel | H02K 3/12 |
| | | | 310/268 |
| 2005/0134135 A1* | 6/2005 | Myers | H02K 3/525 |
| | | | 310/208 |
| 2006/0022552 A1* | 2/2006 | Zhu | H02K 7/14 |
| | | | 310/268 |
| 2006/0220488 A1* | 10/2006 | Koike | H02K 3/28 |
| | | | 310/179 |
| 2007/0138895 A1* | 6/2007 | DeLair | H02K 3/28 |
| | | | 310/179 |
| 2010/0321664 A1* | 12/2010 | Makarovic | G03F 7/70758 |
| | | | 355/72 |
| 2011/0057532 A1* | 3/2011 | Marquardt | H02K 1/2793 |
| | | | 310/156.35 |
| 2014/0339938 A1* | 11/2014 | Passman | F01D 17/162 |
| | | | 310/88 |
| 2016/0126794 A1* | 5/2016 | Gery | H02K 1/2753 |
| | | | 310/60 R |

* cited by examiner

ELECTRICAL MACHINE

BACKGROUND OF THE INVENTION

Field of the Invention

The invention relates to a stator for an electrical machine, comprising a stator block and at least one first and one second phase winding, wherein the first and the second phase windings are supplied with current having different phases, and comprising at least one stator slot, which is arranged in the stator block, wherein in the stator slot, several layers of the first and several layers of the second phase winding are arranged. The invention further relates to an electrical machine with such a stator.

The invention relates to a stator for an electrical machine, for instance, an electric motor. The electrical machine is running multiphase. The stator comprises a stator block, which is provided with several phase windings, which are each applied with current of different phases. The phase windings are provided in one or several stator slots in the stator block.

The stator block often has irregularities, at whose peaks, the field is locally concentrated. The demands on the insulation of the stator winding against the stator block are therefore correspondingly high. A relatively thick electrical insulation between the stator winding and the stator must be provided in order to shield the peak field strengths.

Usually, electrical insulators are also poor heat conductors. That is, the electrical insulation around the stator winding also forms a poor heat-conducting insulation layer. This is problematic, when large currents in the stator winding flow and relatively large heat loss outputs have to be discharged.

In the state of the art, a copper wire with varnish insulation is used for the phase winding of the stator, for instance. Several layers of the copper wire are arranged side by side and one above the other in a stator slot. The varnish thereby insulates adjacent layers of the copper wire against each other. The varnish insulation, however, is often insufficient to insulate the copper wire against the stator block. For this reason, it is known that an additional plastic insulation layer or paper insulation layer is provided between the copper wire and the stator block.

It is also known in transformers to produce the phase winding from aluminum. Usually, an aluminum sheet is used, which is provided with an electrically insulating anodized layer of aluminum oxide. This material has the advantage to be also stable at high temperatures of, for instance, up to 500° C., and to have an approximately two magnitudes higher thermal conductance value than the above-mentioned varnish-insulated copper wires.

At higher-frequency alternating current, the proximity effect plays an essential role between adjacent conductors. The proximity effect is due to the magnetic flux leakage between the conductors. Hereby, the current is pushed to the surface of the conductor, thereby reducing the effective conductor cross section. The electrical resistance load per unit length of the conductor is thereby increased in a disadvantageous way.

This effect significantly increases the loss resistance in anodized aluminum strips at frequencies from several hundreds of hertz. For this reason, in electrical machines such as motors or generators, the phase windings of the stator are produced from thin varnish-insulated copper wires.

The usage of insulated copper wire, however, has the disadvantage of low temperature stability. Thus, the varnish insulation, for instance, is only stable up to temperatures of approximately 200° C. Moreover, the combination of varnish-insulated copper wire with additional plastic insulation or paper insulation has a relatively low thermal conductance value. That is, the heat produced in the phase winding is only poorly discharged by the stator block.

Another disadvantage is the poor degree of filling, with which the copper can be inserted into the stator slot. In the stator slot, numerous copper strands, each being provided with an varnish insulation, are arranged next to one another and one above the other. Thus, a substantial part of the stator slot is needed for the individual varnish insulations so that the degree of filling often only reaches around 50%.

BRIEF SUMMARY OF THE INVENTION

Therefore, it is the object of the present invention to provide a stator for an electrical machine, with which the above-mentioned problems are avoided as possible.

In particular, a stator shall be suggested, in which the proximity effect is significantly reduced.

Furthermore, the object of the invention is to increase the degree of filling of the stator, that is, to fill a larger cross section of the stator slot with electrically conductive material.

A further object is to reduce the stray magnetic field of the stator block.

Moreover, a phase winding with a good thermal conductance value shall be provided. The heat produced in the interior of the phase winding shall be released well to the stator block.

A further object is to provide a stator with a phase winding which is easier to produce.

Another object is to develop a stator which allows improved heat dissipation over the stator block.

At least one of these objects is solved by a stator for an electrical machine, comprising a stator block and at least one first and one second phase winding, wherein the first and the second phase windings are supplied with current having different phases, and wherein at least one stator slot is arranged in the stator block, wherein in the stator slot, several layers of the first and several layers of the second phase winding are arranged, and which is characterized in that in the stator slot, a layer of the first phase winding adjoins a layer of the second phase winding.

The stator according to the invention is used in a multi-phase electrical machine, an electric motor or a generator. In this context, the term "multi-phase" means that at least two currents of different phases are applied to the electrical machine. Accordingly, at least one first phase winding and one second phase winding are provided, through which a first and a second current of different phases are flowing. It may also be useful to provide further phase windings, which are either supplied with the first current, the second current or one or several additional currents of a different phase.

The stator has a stator block, in which at least one stator slot is provided. The stator slot is used to receive the phase windings or a part of the phase windings. The stator slot runs preferably circular or circular-segmented around the axis, around which the rotor of the electrical machine rotates.

The stator slot has an expansion in axial direction (depth of the stator slot), an expansion in radial direction (width of the stator slot) as well as a length expansion, which is extending circular or circular-segmented around the rotation axis. The alignments "radial" and "axial", respectively, here relate to the rotation axis, around which the rotor of an electrical machine with a stator according to the invention would rotate. The phase windings or individual conduction elements, from which the phase windings are arranged, are stapled in several layers into the stator slot. The term "layer" here denotes a certain plane vertically to the axial direction.

According to the invention, conduction elements of the first phase winding as well as conduction elements of the second phase winding are brought in the same stator slot. The individual conduction elements of the two phase windings are provided such that conduction elements lying one above the other belong to different phase windings, that is, a layer of the first phase winding adjoins a layer of the second phase winding.

The currents flowing through the adjoining phase windings are out of phase so that the proximity effect is significantly reduced. Thus, the invention allows the usage of other conductor profiles than thin wires. Hence, the cross section of a phase winding respectively a layer of a phase winding can be varied within wide limits and can be adapted to the shape of the stator slot, for instance. It is no longer mandatory to use thin wires or thin strands. Also rectangular profiles such as ribbon-shaped conductors can be used, which have not been used until now because of the negative effects of the proximity effect.

All layers of the first and of the second phase winding are advantageously arranged such that no layer of the first phase winding adjoins another layer of the first phase winding. Only layers of different phase windings adjoin each other. Since currents of a different phase flow through the different phase windings, the proximity effect is prevented and the entire cross section of a phase winding is used for the current flow. An increase of the electric resistance respectively of the resistance load per unit length of the phase winding by the proximity effect is avoided.

The first and/or second phase winding are each preferably made of several conductor elements, which are electrically connected to each other, and then form the respective phase winding.

The first and/or the second phase winding or parts respectively conductor elements of the first and/or the second phase winding are advantageously formed of a metal sheet and/or ribbon-shaped. The metal sheet or the ribbon is of a good electrically conducting material, normally of a metal, particularly of copper or aluminum.

This embodiment has the advantage compared to a phase winding with the round cross section, to say compared to a common wire, that the cross section of the metal sheet or the ribbon can be adapted to the cross section of the stator slot. For instance, the width of the ribbon can be provided corresponding to the width of the stator slot, so that one layer of the phase winding fills exactly the width of the stator slot. This way, the degree of filling, to say the cross section relation of electrically conducting material to the total cross section of the stator slot, can be significantly increased.

Moreover, the insertion of many parallel thin copper wires or stranded copper wires into the stator slot in the context of a series production is difficult to achieve. By the invention, the production of the stator is considerably easier.

It is also possible to insert two or more ribbons in radial direction side by side into the stator slot. Preferably, however, a ribbon is provided, which extends in radial direction over the entire width of the stator slot.

Aluminum with an insulation layer of aluminum oxide is characterized by a good temperature stability. Thus, the phase windings are preferably produced from anodized aluminum. The aluminum is oxidized, and thus gets an electrically insulation layer of aluminum oxide on its surface. It is of advantage to use metal sheets or ribbon-shaped elements of anodized aluminum for the phase windings.

For production reasons, it is particularly advantageous to cut, punch or otherwise prefabricate ribbon-shaped conductor elements, whose shape and dimensions are adjusted to the stator slot, from the metal sheet. After anodizing these conductor elements, they can be easily inserted into the stator slot.

The ribbon-shaped conductor elements can also be produced by flattening a pipe or a similar profile. The pipe or profile can be bent in the desired shape and flattened by means of a tool. Compared to punching out, this has the advantage that the edges are not sharp, but round. When anodizing, there is the risk that the oxidic protection layer is not forming or not forming sufficiently enough at sharp edges. This is prevented by the curves formed by the flattening.

Several of those conductor elements can then, for instance, be inserted one above the other in axial direction into the stator slot and then electrically connected to each other such that every second stapled conductor element forms a part of a layer or an entire layer of the first phase winding, and the conductor elements lying in between form layers of the second phase winding.

Preferably, the electrical connection of the individual conductor elements and the individual layers of a phase winding is done outside of the stator slot. This is done by bringing out the conductor elements, metal sheets, ribbons or ribbon-shaped elements from the stator slot and to provide them with a connector. It is only necessary then to connect these connectors with each other.

It has shown that the aluminum oxide layer provides in many cases a sufficient electrical insulation so that an additional insulation between the individual aluminum elements, aluminum metal sheets, or aluminum ribbons is not necessary.

It has further proved beneficial to provide at least two basically parallel running stator slots in the stator block. The stator slots are preferably arranged staggered in radial direction. A phase winding is inserted into the stator slot such that inside a stator slot, the current flow is running through all conductor elements of the same phase winding in the same direction. The current flow through the conductor elements inserted into the other stator slot of the same phase winding is, however, oppositely parallel aligned. This way, the outward stray field of the conductor elements of the phase winding inserted into the one stator slot is compensated by the conductor elements of the same phase winding inserted into the other stator slot.

The stator block partly comprises ridges, peaks and a surface roughness. The aluminum oxide layer also has a relatively rough surface. At such inhomogeneities, high electric field strengths can occur. Should the electrical insulation not be sufficient, for instance, because the anodized layer cannot be produced thick enough on the aluminum metal sheets, it is of advantage to provide the stator block such that said stator block has at least in defined areas, particularly in the areas adjoining the stator slot, a specific electrical resistance in the range of a semiconductor, for instance, between $10^4$ ohm mm$^2$/m and $10^8$ ohm mm$^2$/m. These in fact relatively high-resistance, but yet to some extent conducting areas of the stator block are used to homogenize the electrical field in the area of the stator slot and particularly in the insulation of the phase winding so that the field peaks are smoothed.

In a preferred embodiment, the high-resistance area of the stator block has a resistance of more than 50 kohm (50.000

Ω), more than 100 kohm, more than 200 kohm or more than 500 kohm. Preferably, this high-resistance area has a value of less than 10 megaohm, less than 5 megaohm or less than 1 megaohm (1.000.000 Ω).

It is of advantage when the resistance of the high-resistance area is more than a hundredfold or more than a thousandfold of the resistance of the phase winding.

In an embodiment, the stator block or areas of the stator block are made of a casting compound or a composite mixture, which has a high-resistance resistance per unit length. For this, a casting compound or a composite mixture is used, for instance, which is, however, electrically conductive, but has a high-resistance resistance load per unit length. The resistance load per unit length, to say the electrical resistance per length unit, is preferably at least two or three ranges higher than the resistance load per unit length of the phase winding. As casting compound or composite mixture, for instance, resin, silicone or a plastic comes into question, which are mixed with electrically conductive elements of, for instance, graphite or aluminum oxide.

The stator block is preferably made of soft magnetic material (Soft Magnetic Composite—SMC). This allows a cost-effective production of complex stator geometries with very low eddy current losses and isotropic, magnetic characteristics.

The invention is suitable for electric motors as well as generators and particularly electrical machines designed as transverse flux machine. The transverse flux machine is understood as electrical machine, at which the magnetic flux in the stator is primarily moving in one plane, which lies vertically to the moving direction or rotation alignment of the runner or rotor. One could also say: the current flowing through the phase winding/s of the stator flow/s basically parallel to the moving direction of the runner/rotor. The invention is particularly suitable for axial transverse flux machines, at which the magnetic flux passes basically through the air gap between stator and rotor in axial direction—in contrast to radial transverse flux machines, at which the magnetic flux passes basically through the air gap between stator and rotor in radial direction.

In a preferred embodiment of the invention, a phase winding comprises several conductor elements in the stator slot, wherein one or several conductor elements are arranged planar and form one layer. That is, the conductor element/s is/are aligned in a plane, particularly in a plane vertically to the rotation axis of the rotor of the electrical machine. The individual layers are connected to each other outside the stator slot such that these are connected in series and form a phase winding. In the stator slot, the individual layers of the phase winding are lying parallel to each other and parallel to the rotational plane of the rotor. Neither the conductor elements of the same phase winding nor the conductor elements of different phase windings cross each other in the stator slots.

The invention also relates to an electrical machine with a stator as claimed. The invention brings particular advantages for electrical machines, electric motors or generators, which have a rotor and particularly exactly one rotor. The invention provides an electrical machine with constant torque. It is not necessary to mechanically couple several one-phased machines in order to generate a constant torque. The problems connected to a mechanical coupling are thereby avoided.

In a two-phased electrical machine, two phase windings are provided, which are applied with a current offset in the phase by 90°. The stator, for instance, comprises four stator blocks with a pair of stator slots, respectively, wherein each pair of stator slots has a radial inner and a radial outer stator slot running parallel to each other. Within a stator block, both phase windings are arranged such that within a stator slot, no layers of the same phase winding border on each other and that within a layer, to each conductor element of a phase winding in the outer stator slot, a corresponding conductor element of the same phase winding in the inner stator slot is provided, wherein the current flow through the conductor element in the inner stator slot runs opposite to the current flow in the outer stator slot.

In a stator block, the first phase winding, for instance, is applied with a current +I1 and the second phase winding with an alternating current +I2 offset in the phase by 90°. In the other three stator blocks, both phase windings are supplied with current of the combinations +I1, −I2 as well as −I1, +I2 and −I1, −I2. This way, a best possible homogenization of the torque can be reached.

The invention is not limited to two-phased electrical machines. The concept according to the invention can be expanded to three- and multi-phased machines accordingly.

Then again, it can also be reasonable in very large machines to combine several two-phased machines, which are provided phase-shifted to each other, respectively. In this case, the stator may comprise several stator sectors with, for instance, four stator blocks each. In one stator sector, the individual stator blocks are provided as mentioned above. Within one stator sector, a first and a second phase winding are provided, which are phase-shifted supplied with current. The phase windings of different stator sectors also have a phase shift to each other.

The invention has numerous advantages in contrast to the known concepts. Despite the use of phase windings with a large cross section, the proximity effect is greatly reduced. The individual layers of a phase winding can be arranged planar so that each layer runs in a plane parallel to the rotational plane of the rotor. Within the stator slot, no "plane shift" is required. The phase windings are easily and quickly produced since each phase winding can be formed modularly from several uniform conductor elements.

BRIEF DESCRIPTION OF THE SEVERAL VIEWS OF THE DRAWING

The invention as well as further details and embodiments of the invention are explained in more detail by the schematic drawings in the following. Hereby shows FIG. 1 the winding scheme of a stator according to the invention, FIG. 2 a conductor element, from which the two phase windings are composed, FIG. 3 the arrangement of the layers of the two phase windings in the stator block 1*a* of FIG. 1, FIG. 4 the arrangement of the layers of the two phase windings in the stator block 1*b* of FIG. 1, FIG. 5 the resulting magnetomotive force vector in the stator block 1*a* and FIG. 6 the resulting magnetomotive force vector in the stator block 1*b*.

DESCRIPTION OF THE INVENTION

Figure 1:
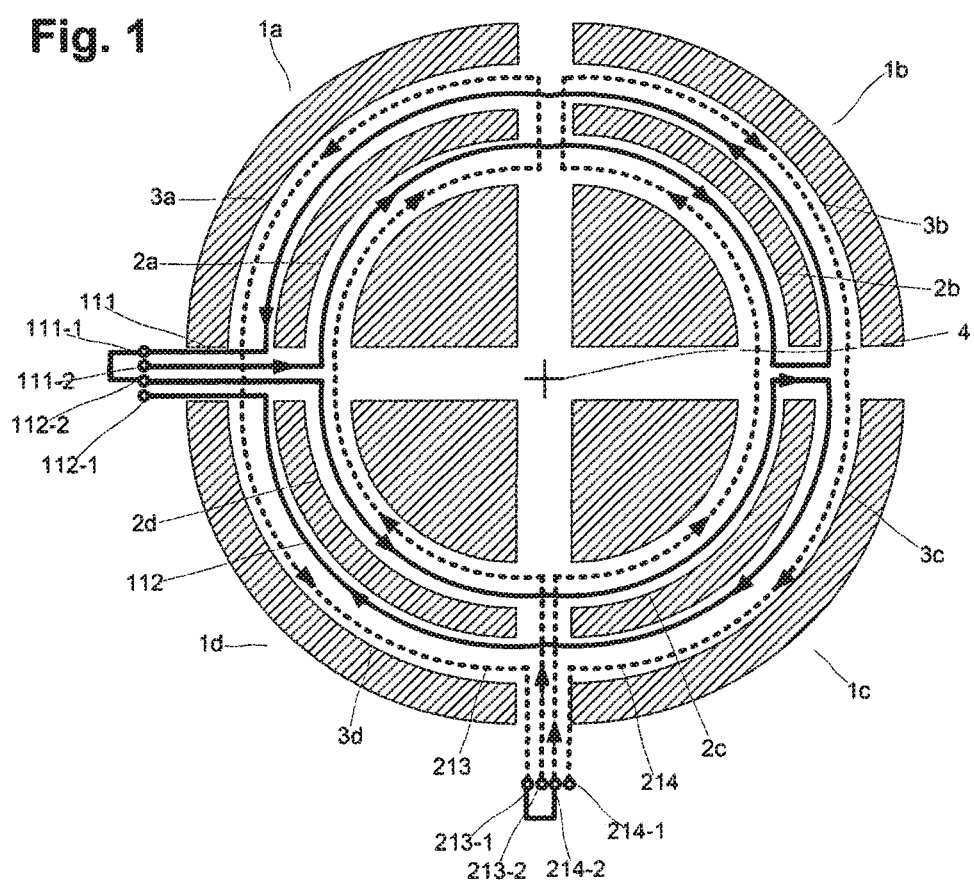

In FIG. 1, the stator of a two-phased electric motor is schematically shown. The stator comprises four stator blocks 1*a*, 1*b*, 1*c*, 1*d*, which are each quarter-circular. Each stator block 1*a*, 1*b*, 1*c*, 1*d* is provided with an inner stator slot 2*a*, 2*b*, 2*c*, 2*d* and an outer stator slot 3*a*, 3*b*, 3*c*, 3*d*, respectively. The stator slots 2*a*, 2*b*, 2*c*, 2*d*, 3*a*, 3*b*, 3*c*, 3*d* are provided parallel to each other and are also circularly provided around the rotation axis 4 of the rotor not shown for reasons of clarity.

Figure 2:
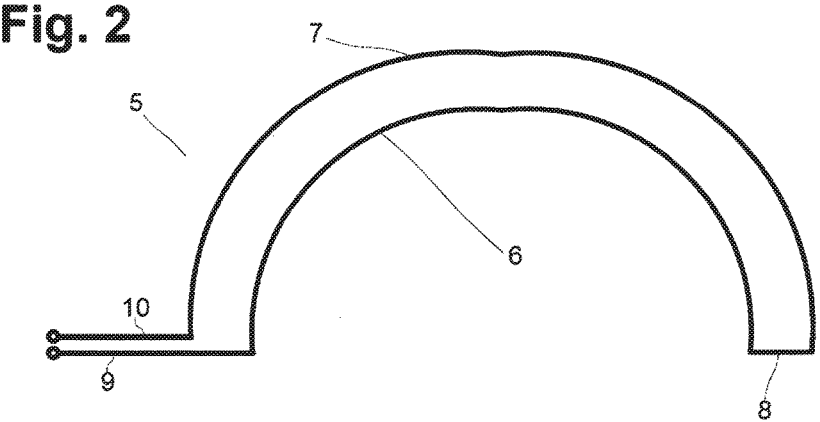

In the stator slots 2a, 2b, 2c, 2d, 3a, 3b, 3c, 3d, several layers of a first and of a second phase winding are inserted. The first and the second phase winding are composed of conductor elements 5 as shown in FIG. 2.

A conductor element 5 is made of anodized aluminum sheet and is of two semi-circular arches 6, 7, whose shape and size are adapted to the inner and to the outer stator slot 2a, 2b, 2c, 2d, 3a, 3b, 3c, 3d. The inner arch 6 and the outer arch 7 are connected with each other at one of their ends by a connecting piece 8. At the other ends of the arches 6, 7, connection elements 9, 10 are provided. The entire conductor element 5 comprising the arches 6, 7, the connecting piece 8 and the connection elements 9, 10, may be produced, for instance, from punching out from an aluminum sheet.

The conductor elements 5 are adapted planar into the stator slots 2a, 2b, 2c, 2d, 3a, 3b, 3c, 3d. The conductor elements 5 are formed such that they cover the entire width of the stator slots 2a, 2b, 2c, 2d, 3a, 3b, 3c, 3d in radial direction.

A first conductor element 111 is inserted into the stator slots 2a, 2b, 3b, 3a and a second conductor element 112 is inserted into the stator slots 2d, 2c, 3c, 3d. Thereby, the two conductor elements 111, 112 are oriented such that their connection elements 111-1, 111-2, 112-1, 112-2 come to lie in the area of the gap between the two stator blocks 1a, 1d. The two conductor elements 111, 112 form a first layer 101 of the first phase winding. This first layer 101 lies planar in a plane in the stator slots 2a, 2b, 2c, 2d, 3a, 3b, 3c, 3d.

In analog manner, two conductor elements 211, 212 are placed on the conductor elements 111, 112. The conductor elements 213, 214 are thereby rotated by 90° against the conductor elements 111, 112, to say conductor element 213 is provided in the stator slots 2d, 2a, 3a, 3d and conductor element 214 is accordingly provided in the stator slots 2c, 2b, 3b, 3c. The connection elements 213-1, 213-2, 214-1, 214-2 are again arranged side by side. The two conductor elements 213, 214 form a first layer 201 of the second phase winding.

On this first layer 201 of the second phase winding, a second layer 102 of the first phase winding is applied. The second layer 102 of the first phase winding is identical with the first layer 101 of the first phase winding. Hereupon, a second layer 202 of the second phase winding is then placed. This way, several layers of the first and the second phase winding are alternately placed one above the other (see FIGS. 3, 4). All layers belonging to the same phase winding are hereby provided identically.

The connection elements 11-1, 12-1 respectively 13-1, 14-1 of the conductor elements belonging to one phase winding are arranged side by side respectively one above the other outside of the stator slot 2a, 2b, 2c, 2d, 3a, 3b, 3c, 3d. The connection elements 11-1, 12-1 respectively 13-1, 14-1 are connected by connecting bridges 15, 16 such that all conductor elements belonging to one phase winding are connected in series and form the desired phase winding.

Figure 3:
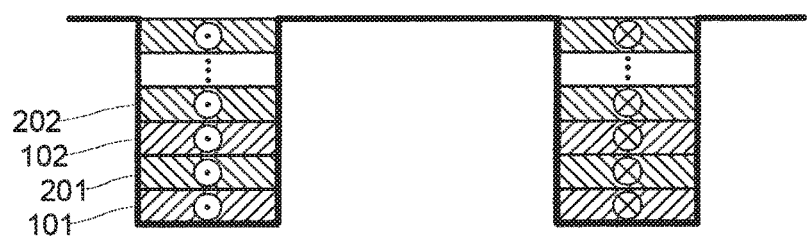
Figure 4:
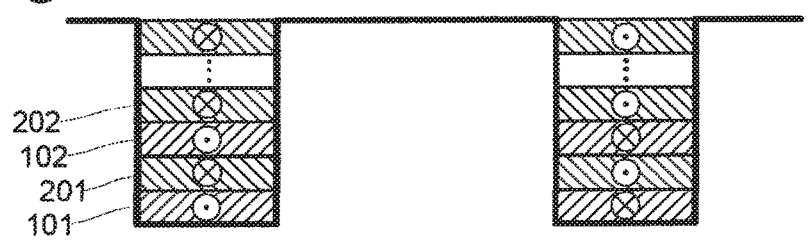

FIG. 3 shows the arrangement of the layers 101, 201, 102, 202 of the first and the second phase winding in the inner stator slot 2a and the outer stator slot 3a of the stator block 1a. A corresponding arrangement is shown in FIG. 4 for the stator block 1b.

Figure 5:
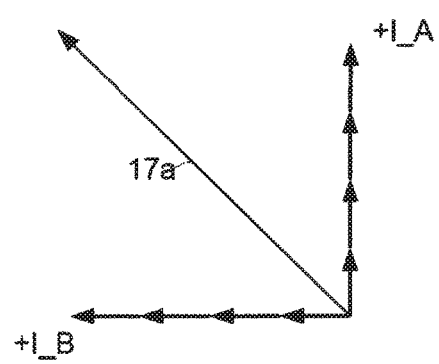

FIG. 5 schematically shows the current feed of the two phase windings and, as a result, the magnetomotive force vector 17 in the stator block 1a. A current $I_A$ sin wt shall flow through the first phase winding and a current $I_B$ cos wt shall flow through the second phase winding. That is, the two phase windings are applied with alternating currents phase-shifted by 90°.

In the schematic drawing in FIG. 1, the two currents $I_A$ sin wt and $I_B$ cos wt pass through the conductor elements 5 in the stator block 1a anticlockwise, respectively. This direction will be referred to as positive. Accordingly, a current of $+I_A$ sin wt $+I_B$ cos wt is the result. Taking into account their phase shift, this results in the magnetomotive force vector 17a shown in FIG. 3a.

Figure 6:
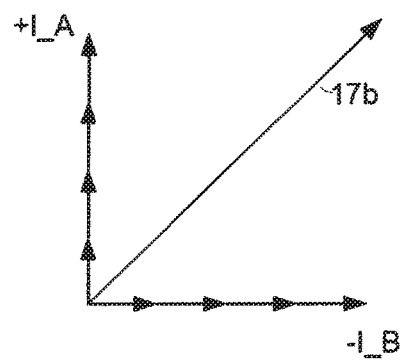

Corresponding considerations can be made for all stator blocks 1a, 1b, 1c, 1d. It appears that the resulting magnetomotive force vectors 17a, 17b, 17c, 17d are phase-shifted by 90° between each other, respectively. FIG. 6 shows this again as an example for the stator block 1b.

By the phase shift of the resulting magnetomotive force vectors 17a, 17b, 17c, 17d in the individual stator blocks 1a, 1b, 1c, 1d it is ensured that overall a uniform torque is generated.

The invention claimed is:

1. A stator for an electrical machine, the stator comprising:
   a stator block;
   at least one first phase winding and at least one second phase winding;
   said first and second phase windings being supplied with current of mutually different phases;
   said stator block having at least one stator slot formed therein;
   wherein several layers of said first phase winding and several layers of said second phase winding are arranged in said stator slot;
   a layer of said first phase winding adjoining a layer of said second phase winding in said stator slot; and
   insulation between said first phase winding and said stator block and/or between said second phase winding and said stator block, said insulation being only an aluminum oxide layer.

2. The stator according to claim 1, wherein no layer of said first phase winding adjoins another layer of said first phase winding in said stator slot.

3. The stator according to claim 1, wherein one or both of said first or second phase windings is formed of a metal sheet.

4. The stator according to claim 1, wherein one or both of said first or second phase windings is made of aluminum.

5. The stator according to claim 4, wherein said one or both of said first or second phase windings is made of anodized aluminum.

6. The stator according to claim 1, wherein one or both of said first or second phase windings is a prefabricated aluminum part.

7. The stator according to claim 6, wherein said prefabricated aluminum part is a punched aluminum part.

8. The stator according to claim 1, wherein said stator block is formed with at least two, mutually parallel stator slots.

9. The stator according to claim 8, wherein said first phase winding or said second phase winding is disposed in said stator slots such that a current flowing in one direction through said first phase winding or said second phase winding is equal to a current flowing in an opposite direction.

10. An electrical machine, comprising a stator according to claim 1.

11. The electrical machine according to claim 10, which further comprises a rotor.

12. The electrical machine according to claim 11, wherein said rotor is exactly one rotor.

13. The electrical machine according to claim 11, wherein said rotor is a disc-shaped rotor.

14. The electrical machine according to claim 10, configured as a transverse flux machine.

* * * * *